July 16, 1940. E. S. LARSON ET AL 2,207,743
TELEGRAPHIC TRANSMISSION AND AUTOMATIC PRINTING OF METER READINGS
Filed Dec. 31, 1935   2 Sheets-Sheet 1

INVENTOR
EDWARD S. LARSON
CARL A. LEVIN
BY H. B. Whitfield
ATTORNEY

July 16, 1940.  E. S. LARSON ET AL  2,207,743
TELEGRAPHIC TRANSMISSION AND AUTOMATIC PRINTING OF METER READINGS
Filed Dec. 31, 1935  2 Sheets-Sheet 2
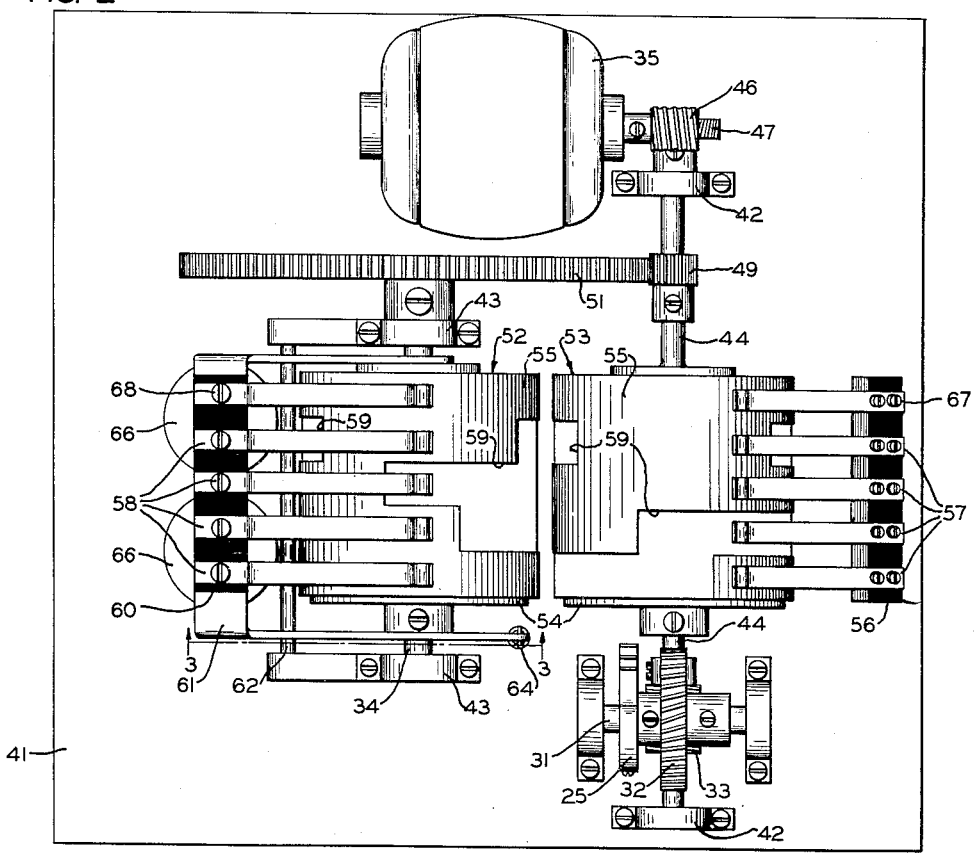
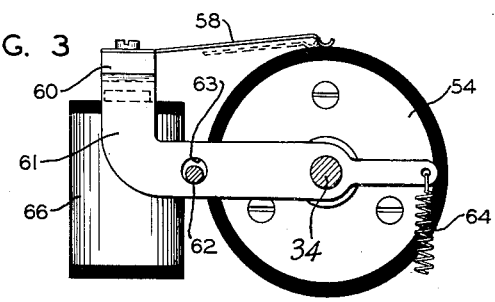
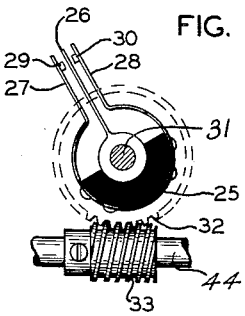
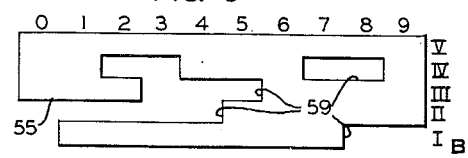
INVENTOR
EDWARD S. LARSON
CARL A. LEVIN
BY
ATTORNEY Patented July 16, 1940

2,207,743

UNITED STATES PATENT OFFICE 2,207,743

TELEGRAPHIC TRANSMISSION AND AUTOMATIC PRINTING OF METER READINGS

Edward S. Larson and Carl A. Levin, Chicago, Ill., assignors to Teletype Corporation, Chicago, Ill., a corporation of Delaware Application December 31, 1935, Serial No. 56,924

14 Claims. (Cl. 177—351)

This invention relates to systems and apparatus for transmitting and recording power meter readings, and particularly to the automatic conversion of power meter readings into code combinations capable of transmission to and reception by printing telegraph apparatus.

An object of the invention is to provide for the automatic transmission of meter readings representing the condition of a plurality of electrical circuits in rapid succession and in predetermined order.

The invention features means for preventing interruption of the transmission of a series of readings, except at the termination of a series, means for insuring that transmission of a reading may not take place until steady deflection of a meter is reached, that a changing circuit condition cannot interfere with the transmission of a reading, and means for minimizing the possibility of a false reading.

Briefly, the system includes a sequence switch comprising a plurality of banks of contacts with which brushes cooperate. The brushes are advanced from one to another of the contacts by a stepping magnet. The sequence switch is employed to connect a plurality of power circuits to measuring instruments sequentially.

Each measuring instrument, of which there may be two to be interpreted alternately, has its indicating element capable of closing either of two contacts on a motor actuated member, whereby the member and the contact arms it carries may be caused to follow the indicating element and assume a position corresponding to that of the indicating element.

A translating unit comprising a pair of commutators and brushes associated therewith is employed for interpreting the position of the measuring instrument indicating element by setting up a code combination representative of that position and capable of being transmitted telegraphically. The two commutators are geared together in a ratio of ten to one to afford a reading composed of two digits decimally related, and are driven by the motor which drives the hereinbefore mentioned contact arm supporting member so that the positions of the commutators may at all times represent the position of the arm. The brushes engage conductive and non-conductive portions of the surface of a commutator and serve to pick up the code combination of any set of surface portions.

A transmitting distributor which comprises a plurality of conductive segments sequentially engaged by a brush is connected to the translating unit, whereby the code combination which corresponds to a meter reading may be impressed upon a telegraph line to be received by a printing telegraph apparatus.

In the particular embodiment of the invention herein disclosed, two electrical measuring instruments are employed, and a translating unit is permanently associated with each instrument. The two instruments measure different electrical characteristics, and they are connected alternately to the circuits which it is desired to meter. Each meter is connected to a circuit while two adjacent contacts of a bank of contacts of the sequence switch are traversed by the brush, the first contact engagement providing for the bringing of the meter to a steady deflection and the second providing for the transmission of the reading. The alternate association of the meters with the circuits enables the transmission of the reading of one meter while the other meter is being conditioned for reading.

The invention includes means for transmitting a spacing combination after each pair of digits, and for transmitting carriage return and line feed signals for accomplishing those functions when the readings are transmitted to and printed by a page printing receiver.

For a thorough understanding of the invention, reference may be had to the following detailed description taken in connection with the accompanying drawings in which:

Fig. 2 is a plan view of one embodiment of a translating unit;

Fig. 3 is a sectional elevation taken on the line 3—3 of Fig. 2;

Fig. 4 is a schematic representation of a portion of a registering meter;

Fig. 5 is a chart of a set of code combinations which may be employed, and

Fig. 6 is a plan view of a conductive plate which may be applied to a translating unit commutator cylinder.

Figure 1:
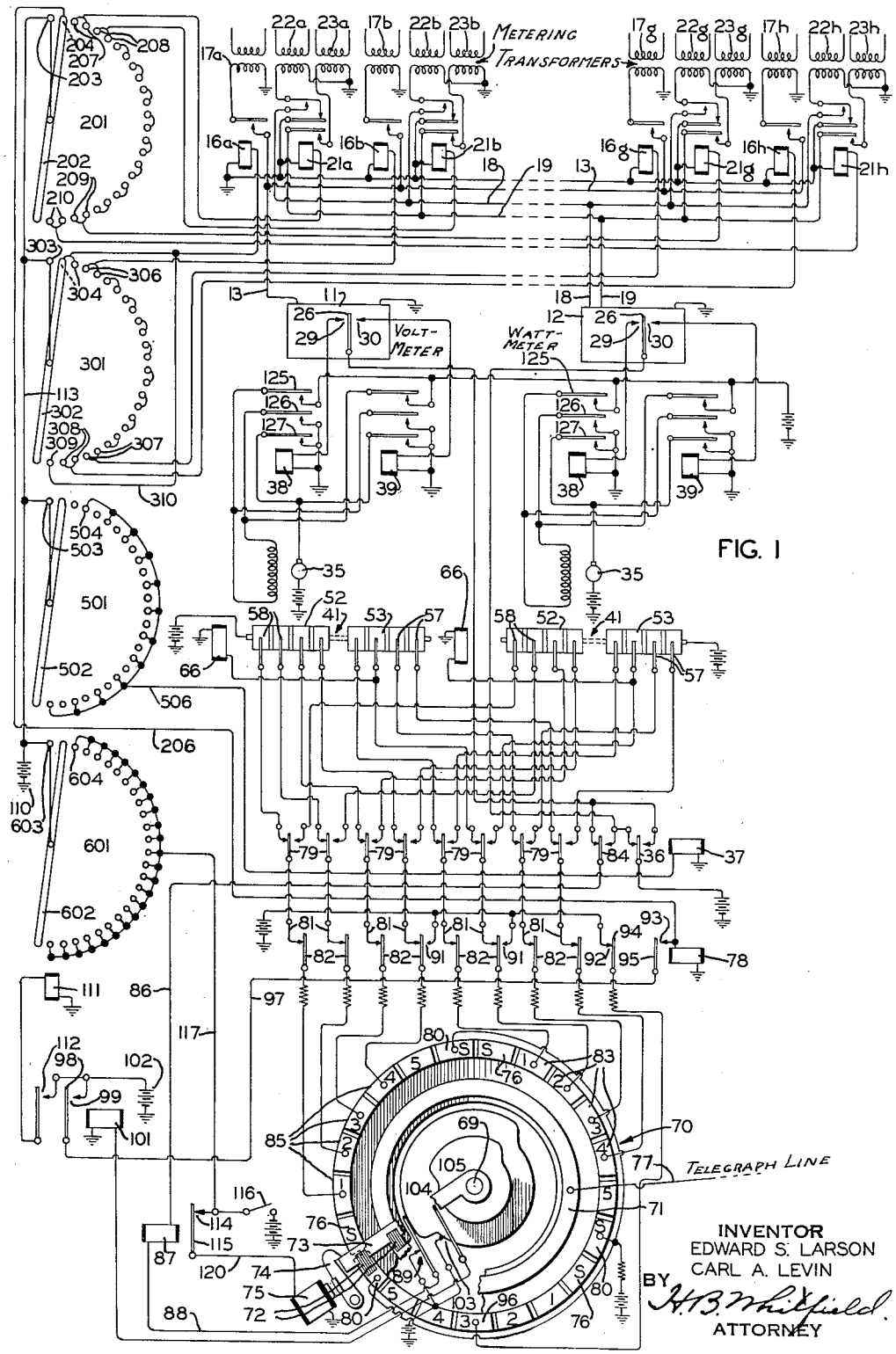
Fig. 1 is a schematic circuit diagram of a meter reading transmission system in accordance with the invention.

Divisional application Serial No. 134,871, filed April 3, 1937 by E. S. Larson contains claims directed to novel features of the translating unit shown in detail in Figs. 2 to 6, inclusive.

Referring now to the drawings, in which like reference characters designate corresponding parts throughout the several views, and particularly to Fig. 1, the reference numeral 11 designates a meter for giving an indication of the condition of an electrical circuit, such as a voltmeter, and the numeral 12 designates a meter for giving an indication of a different condition, such as a wattmeter. The voltmeter 11 has one terminal connected by a conductor 13 to the fixed contacts of a plurality of switching relays 16a, 16b, 16g, and 16h. The movable contacts or armatures of the relays 16a, 16b, 16g, and 16h are connected respectively to one terminal of the secondary windings of the transformers 17a, 17b, 17g, and 17h. The other terminal of the meter 11 and of the secondary windings of each of the transformers 17a, 17b, 17g, and 17h is grounded, and the primaries of the transformers are connected to any power lines the voltages of which it is desired to read. Upon energization of any of the swtching relays 16a, 16b, 16g or 16h the voltmeter 11 will be connected to the corresponding power line transformer and the voltmeter pointer will be deflected to indicate the voltage condition within the selected power circuit.

The wattmeter 12 is connected by a conductor 18 to one contact of a normally open contact pair, associated with each of the switching relays 21a, 21b, 21g, and 21h and the other contact of each of the pairs is connected to one terminal of the secondary windings of the transformers 22a, 22b, 22g, and 22h respectively, which may be voltage transformers for impressing upon the wattmeter 12 a voltage condition. A conductor 19 connects the wattmeter 12 to one contact of another normally open contact pair associated with each of the switching relays 21a, 21b, 21g, and 21h, and the other contact of each of last mentioned pairs is connected to one terminal of the secondary windings of the transformers 23a, 23b, 23g, and 23h respectively, which may be current transformers for impressing upon the wattmeter 12 a current condition. The remaining terminal of the meter 12, and of the secondary windings of the transformers 22a, 23a, 22b, 23b, 22g, 23g, 22h and 23h are grounded, and the primaries of the transformers are connected to any power lines the power consumption in which it is desired to read. Upon energization of one of the switching relays 21a, 21b, 21g, or 21h the two pairs of normally open contacts associated therewith will be closed and the corresponding voltage and current transformers will be connected to the wattmeter to cause a deflection of the meter pointer in accordance with the power condition in the selected power circuit.

The meters 11 and 12 may be recording meters of any well known commercial type, having an element movable with the meter pointer to give an indication of the position of the pointer. One possible arrangement is shown schematically in Fig. 4, the electrical circuits therefor being shown in Fig. 1. The meter is provided with an indicating pointer 26. At opposite sides of the pointer are contact arms 27 and 28 mounted on non-conductive segment 25 and provided with contacts 29 and 30 respectively. The non-conductive segment 25 is carried by a shaft 31 which is mounted coaxially with the pointer 26 and which may rotate through an arc equal to the range of movement of the pointer. The shaft 31 may be provided with gear 32 meshing with worm 33 carried by shaft 44 which is driven from motor 35.

As shown in Fig. 1, battery is applied to the pointer 26 of the meter 11 from contact arm 36 of gang switching relay 37 when the relay is energized and to the pointer 26 of meter 12 when relay 37 is deenergized. A switching relay 38 is connected to the contact 29 of each of the meters, and a switching relay 39 is connected to the contact 30 of each of the meters. Each of the relays 38 and 39 is operable to close three pairs of contacts upon engagement of a meter pointer 26 with a contact 29 or 30, if battery is then applied to that pointer through the contact arm 36 of relay 37. Upon closure of the three contact pairs associated with a relay 38, battery is applied through the outermost contact pair 125 to the field of motor 35, the return from the field being through the intermediate contact pair 126 to ground. The innermost contact pair 127 completes the circuit of the armature of motor 35 to cause the motor to drive the shaft 34 and through it the member 31, and thus to move the contact arms 27 and 28. It will be understood that engagement between a pointer 26 and contact 29 will be due to deflection of the pointer by reason of the application of a potential difference across the meter. Battery is applied to the field of motor 35 in that electrical sense which will drive the motor in a direction to cause the contact arm to recede from the advancing pointer. The contact arms 27 and 28 thus travel with the pointer 26 until the pointer comes to rest, whereupon further movement of the contact arms results in disengagement of the contact 29 from the pointer 26 and removal of battery from relay 38. The release of relay 38 permits the three associated contact pairs to open, and motor 35 comes to rest.

When the movement of pointer 26 is in a direction to bring it into engagement with contact 30, relay 39 is energized and its associated three contact pairs are closed. The closure of the contact pairs completes the circuits of field and armature of motor 35 as in the case of the operation of relay 38, except that battery is applied to the field in the opposite direction, and motor 35 is driven in opposite direction, to cause contact arm 28 to recede from pointer 26.

As shown in detail in Fig. 2, and schematically in Fig. 1, there is provided a translating unit for interpreting a meter pointer position and coding the meter reading permutably in impulses capable of transmission telegraphically. The translating unit comprises a base 41 which supports the motor 35 and on which are mounted shaft supporting blocks 42—42 and 43—43. Blocks 42 support rotatable shaft 44 and blocks 43 support shaft 34. Shaft 44 carries a pinion 46 secured thereto and meshing with worm 47 carried by the armature shaft of motor 35. Shaft 44 also has secured thereto gear 49 which drives gear 51 which is secured to shaft 34. The ratio between gear 51 and gear 49 is 10 to 1, so that shaft 34 revolves once for ten revolutions of shaft 44.

The motor driven shafts 34 and 44 support commutators 52 and 53 respectively which are identical, for which reason the description will be confined to one commutator.

In one embodiment the commutator consists of a non-conductive cylinder 54 mounted on the shaft 34 or 44 and having arranged upon the periphery and in conformance with the surface thereof a conductive plate 55 which in certain areas entirely surrounds the cylinder. The plate 55 which may be secured to the cylinder 54 by any desired means has apertures 59 therein through which portions of the surface of the non-conductive cylinder are exposed. A plan view of one of the plates 55 before being curved to conform to a cylinder 54 is shown in Fig. 6. The plate 55 is of predetermined irregular contour by virtue of the fact that portions are cut away. Although the plate 55 is a unitary structure, its surface affords a plurality of zonal areas, preferably five in number, each zonal area extending from end to end of the plate and affording peripheral zones when the plate is applied to one of the commutator cylinders 54. The zones are indicated in Fig. 6 by the reference numerals I, II, III, IV, and V. The zone designated V is metallic without interruption, whereas each of the other zones has cutaway portions 59. The surface of the plate 55 also comprises zones extending transversely thereof and designated by the numerals 0 to 9 inclusive in Fig. 6. Each of the zones 0 to 9 differs from every other zone in the relative positions of metallic surface and cut-away portion. Thus zone 0 is metallic where it coincides with zones III, IV, and V; zone 1 is metallic where it coincides with zones I, III, IV, and V; zone 2 is metallic where it coincides with zones I, III, and V, etc.

Attention is now directed to Fig. 5, which indicates in tabular form a code for coding numbers. The first column contains the numbers from zero to nine. Opposite each number is an indication of the relative arrangements of code impulses on the basis of a four unit code, which is ample for coding the ten primary numbers. The term "impulse" as herein used is not to be construed as indicating a current condition on the line. In printing telegraph systems, different impulses, ordinarily termed marking and spacing impulses, may be evidenced by current flow in opposite directions, or they may be evidenced by current and no-current conditions. For the purposes of this description, marking impulses will be assumed to indicate current on the line, and spacing impulses will indicate a no-current condition. In the table of Fig. 5, blank rectangles may be assumed to indicate spacing impulses and numbered rectangles may be assumed to indicate marking impulses. Thus zero is represented by marking impulses in the third and fourth impulse positions, the digit 1 is represented by marking impulses in the first, third, and fourth impulse positions, the digit 2 is represented by marking impulses in the first and third impulse positions, etc.

Now, drawing a comparison between the table of Fig. 5 and the contour of the plate 55 shown in Fig. 6, it will be observed that the first impulse in the code of each of the numbers 1 to 7 inclusive is marking, and that plate 55 is metallic where zones 1 to 7 inclusive coincide with zone I; that the second impulse of numbers 5 to 9 inclusive is marking, and that plate 55 is metallic where zones 5 to 9 inclusive coincide with zone II; that the third impulse of numbers 0, 1, 2, 6, 7, 8, and 9 is marking, and that zones 0, 1, 2, 6, 7, 8, and 9 are metallic where they coincide with zone III; that the fourth impulse of the code of numbers 0, 1, 4, 5, 6 and 9 is marking, and that zone 0, 1, 4, 5, 6 and 9 are metallic where they coincide with zone IV. Similarly those portions by which plate 55 fails to be a solid rectangular plate correspond to the blank rectangles of Fig. 5. Zone V is not mentioned in the above comparison, for the reason that it bears no relation to the coded portion of the commutator but serves as a means for supplying potentials to the coded portion, as will be described later.

The code arrangement is shown in Fig. 5, and embodied in conductive material in the plate 55 in Fig. 6, has been developed with the aim of having definite relationships between the code combinations of the several digits. The relationship is that the code combination for any digit differs from that of its preceding or succeeding digit by one code impulse. Not only is the difference one impulse, but any two successive digits have at least one impulse of each in the same code position, successive digits coded in two and three impulses each have two impulses in the same code positions, and as between three-impulse and four-impulse codes, three impulses of each occupy the same code positions. Thus zero has impulses 3 and 4; 1 differs from zero by the addition of impulse 1; 2 differs from 1 by the subtraction of impulse 4; 3 differs from 2 by the subtraction of impulse 3; 4 differs from 3 by the addition of impulse 4; 5 differs from 4 by the addition of impulse 2; 6 differs from 5 by the addition of impulse 3; 7 differs from 6 by the subtraction of impulse 4; 8 differs from 7 by the subtraction of impulse 1; 9 differs from 8 by the addition of impulse 4; and zero differs from 9 by the subtraction of impulse 2. Thus the sequence of numbers of impulses for the digits zero to 9 inclusive is two, three, two, one, two, three, four, three, two, three.

With the arrangement described in the preceding paragraph, the possibility of error in coding digits is minimized. When in the operation of the commutator a marginal condition is encountered, wherein, by an imperceptible movement of the commutator one way or the other either of two adjacent code combinations may control transmission, or due to slight variations in alignment of the contactors which co-operate with the coded commutator, certain contactors may engage an area representing one code combination and others may engage an area representing another code combination, no combination of impulses can be applied to the contactors which differs from the codes of both of the areas. Thus, one or the other of the two code combinations between which the contactors are attempting to differentiate will be applied to the transmitter, and these code combinations represent numerical values differing by the numerical value one (1). In the specific embodiment of the invention described herein, such a marginal condition of operation can occur only in the coding of units values, as a feature to be described later avoids such marginal conditions in the coding of tens values.

Adjacent to commutator 53 there is mounted on the base 41 a block 56 of non-conductive material. A plurality of brushes are mounted on the block 56, there being a brush 57 to cooperate with each of zones I, II, III, and IV and a brush 67 to cooperate with zone V. The brushes 58 which cooperate with zones I, II, III, and IV and brush 68 which cooperates with zone V of commutator 52 are mounted on a strip 60 of non-conductive material carried by a metallic yoke 61 which is pivotally mounted on the shaft 34. A fixed rod 62 (Figs. 2 and 3) disposed within an aperture 63 in an arm of the yoke 61 limits the distance through which the yoke 61 may move about the shaft 34. The yoke 61 is biased to its uppermost position by a spring 64 engaging an extended portion of an arm of the yoke. Mounted below that portion of the yoke which supports the non-conductive strip 60 is an electromagnet 66 for which the yoke 61 serves as armature.

The electromagnet 66 of the translating unit is operable, as is apparent from Fig. 3, to rotate the yoke 61 counterclockwise against the tension of spring 64, whereby the brushes 58 are shifted from the full line to the dotted line position of Fig. 3. Upon deenergization of the magnet, the spring 64 restores the yoke 61 and brushes 58 to the unshifted position. The purpose for which this shifting of brushes is provided is to insure a sharp line of division between adjacent signal combinations as applied to the brushes 58 by the commutator 52. Since the commutator 53 completes one revolution for each one-tenth revolution of the commutator 52, it is desirable that as that portion of the commutator 53 which represents the digit 9 passes out of engagement with the brushes 57 and the portion representing the digit 0 engages those brushes, the area of commutator 52 representing the next higher tens digit shall be presented to the brushes 58, and conversely, as the units commutator 53 rotates in the opposite direction and passes from 0 to 9, the commutator 52 shall present the code combination area corresponding to the next lower tens digit to the brushes 58. The shifting of the brushes 58 by the electromagnet 66 insures the proper carry-over as between the units and tens digits signals.

The preferred control of the electromagnet is from a circumferential portion of the units commutator 53 which changes in character between 9 and 0. It will be noted in Fig. 6 that zone II is conductive in the area corresponding to the digit 9 and is non-conductive in the area corresponding to 0. The brush which engages that zone is the second of the brushes 57. This brush may be connected to one terminal of the winding of the magnet 66, which may have its other terminal grounded, so that when the brush engages the conductive portion of the commutator, to which a source of potential is connected, the magnet will be energized and the brushes will be shifted. The connections for the magnet 66 are shown in Fig. 1.

As indicated in Fig. 6, by the change zone II from a conductive to a non-conductive condition between the digits 5 and 4, the magnet 66 will be energized as the commutator 53 passes from 4 to 5 and will be deenergized as the commutator passes from 5 to 4 so that the brushes 58 will be shifted. The rotational relationship between the commutators is such that the central portion of an area representing a tens digit will be presented to the brushes 58 when the area of commutator 53 representing the digit 4 or the area representing the digit 5 is presented to the brushes 57, and the shift of the brushes 58 is not of sufficient magnitude to result in a change in the signal combination presented to the brushes 58.

The zones V with which the brushes 67 and 68 contact are uninterruptedly metallic, so that a continuous peripheral conductive strip is formed around the commutator with which the remaining metallic surface portion of the commutator is electrically continuous. Battery is permanently connected to the brushes 67 and 68, and thus the potentials are delivered to those of the brushes 57 and 58 which, for any positions of the commutators 52 and 53, engage metallic portions of the surfaces thereof. The brushes 57 and 58 are connected to other electrical apparatus in the manner shown in Fig. 1.

As shown in Fig. 1, two of the translating units 41—41 are included in the system, there being one associated with the voltmeter 11 and another associated with the wattmeter 12.

In Fig. 1, the reference numeral 70 indicates a transmitting distributor which is employed for impressing on a telegraph line the permutation code impulses derived from the translating units. Transmitting distributor 70 comprises a continuous conductive ring 71, a segmented ring comprising a plurality of conductive segments to which reference characters may be applied as the description proceeds, and brushes 72—72 carried by rotatable brush arm 73 fixed to shaft 69. The shaft 69 may be driven in any suitable manner such as by a motor (not shown), preferably through a friction clutch (not shown), and a latch 74 restrains the brush arm from movement except when it is withdrawn from engagement therewith upon energization of start magnet 75.

The continuous conductive ring 71 of transmitting distributor 70 is connected to the telegraph line 77 over which signals are to be transmitted, and by means of the ring 71 cooperating with its brush, signaling impulses are impressed upon the telegraph line.

The transmitting distributor herein employed is intended for use in transmission by the start-stop system in which each group of impulses representing a character or printer function is preceded by a start signal and is followed by a stop signal. The series of distributor segments hereinbefore mentioned supplies to its brush the start and stop signals as well as the character impulses. In Fig. 1 the segments of the distributor which furnish start and stop signals have been designated by the letter S and by reference numerals 76 and 80 respectively, and the segments which transmit character code impulses have been numbered 1 to 5 in groups, as the particular distributor disclosed will accommodate a permutation code of five units, whereas a four unit code will accommodate the transmission of the meter readings.

The brushes of the translating units deliver signaling impulses to the segments of the transmitting distributor through fixed contacts and movable contact arms of two switching relays, one of which is designated by the reference character 37 and the other by the reference character 78. Each of the relays 37 and 78 has ten movable contact arms. Each of the contact arms of relay 37 is movable between two contacts and the eight brushes of the translating unit associated with voltmeter 11 are connected to contacts of switching relay 37 which are engaged by contact arms 79 when the relay is not energized. The eight brushes of the translating unit which is associated with wattmeter 12 are connected to contacts of relay 37 that are engaged by the contact arms 79 when the relay is energized. The eight contact arms 79 of relay 37 which engage contacts connected to the translating unit brushes are connected to eight fixed contacts 81 of switching relay 78. The eight contact arms 82 which cooperate with the eight fixed contacts 81 of relay 78 are connected to numbered segments of the transmitting distributor, four being connected to the four segments designated 85 immediately following the first start segment and the remainder being connected to the four segments designated 83 following the second start segment. The conductive paths to the segments 85 and 83 of the distributor are continuous through the contact arms of relay 78 when the relay is deenergized and are interrupted at those points when the relay is energized.

In addition to the contact arms 36 and 79 hereinbefore described, the switching relay 37 has a movable contact arm 84 which is connected by a conductor 86 to one end of the winding of a switching relay 87, the other end of which is connected by conductor 88 to one of a pair of cam operated contacts 89 associated with the transmitting distributor 70, the other contact of the pair being connected to grounded battery. The contact arm 84 is movable between two contacts, each of which is connected to the indicator pointer of one of meters 11 and 12, the arrangement being such that when relay 37 is deenergized the pointer of meter 11 is connected to conductor 86 and relay 87 and when relay 37 is energized the pointer of meter 12 is connected thereto.

In addition to contacts 81 and contact arms 82, relay 78 has contacts 91 engaged by two of the contact arms 82 when relay 78 is energized, contact 92 engaged by contact 94 when relay 78 is deenergized, and contact 93 engaged by contact arm 95 when the relay is energized. By means of contacts 91, battery is applied to the fourth one of distributor segments 85 and to the second one of segments 83. Through contact 92 and contact arm 94 battery is applied to distributor segment 96 which is the third segment following the third start segment 76. Contact arm 95 engages contact 93 when relay 78 is energized to establish a locking circuit for relay 78 by virtue of conductor 97, contact arm 98, and contact 99 of switching relay 101, and battery 102, it being understood that relay 101 must be energized in order for the locking circuit to be established.

Switching relay 101 becomes energized upon having battery applied thereto through cam operated contact pair 103 associated with the transmitting distributor 70. The contact pairs 89, previously mentioned, and 103 are closed by cams 104 and 105 rotated by the shaft 69. The cams 104 and 105 are so disposed on shaft 69 with respect to the brush arm 73 that both contact pairs are closed when the distributor brush leaves the fourth segment in group 83. Contact pair 103 opens immediately after the distributor brush passes from segment 96, but contact pair 89 remains closed until the distributor brush passes onto the first segment of group 85. The timing of opening and closing of the contact pairs 89 and 103 with respect to a cycle of operation of the brush arm 73 is clearly indicated by the lengths of the dwells of cams 104 and 105.

At the left of Fig. 1 there is shown a sequence switch consisting of four banks of contacts designated 201, 301, 501, and 601 over which sweep contact brushes designated 202, 302, 502, and 602 respectively. The brushes are stepped around the contact banks by a stepping magnet 111 which is energized from battery 102 through contact pair 112 when relay 101 is energized. The first contact of each bank designated 203, 303, 503, and 603 is connected to the brush of that bank, and those contacts are connected together parallelly by the conductor 113 to which grounded battery 110 is connected, whereby all of the brushes are electrically connected to each other and to battery.

Referring now to contact bank 201, the second contact 204 is connected by conductor 206 to one side of the winding of switching relay 78, the other side of the winding being grounded. The third and fourth contacts designated 207 are connected together and to one side of the winding of relay 21a, and similarly all succeeding pairs of contacts are connected together and to relays in the 21 series, examples being contacts 208, 209, and 210 connected respectively to relays 21b, 21g, and 21h. Those connected contacts between contacts 208 and contacts 209 are intended for connection with other switching relays similar to relays 21a and 21b, and such other relays will connect to other power circuit transformers similar to 22a and 23a. Each of the relays 21a, 21b, etc. has one end of its winding grounded.

Contact bank 301 has its second and third contacts, designated as 304, connected together, its fourth and fifth contacts, designated as 306, connected together and so on around the bank, leaving a single contact 309 at the end of the bank. Contacts 304, 306, 307 and 308 are connected respectively to the windings of switching relays 16a, 16b, 16g, and 16h. The additional connected contacts shown may connect to additional relays similar to 16a which control additional power circuit transformers similar to 17a. Contact 309 is connected by conductor 310 to contacts 304 and therefore to relay 16a.

It is important to note at this point that brushes 202 and 302 engage associated relay circuits a period of time represented by two contacts of the bank, by reason of the electrical linking of the contacts in pairs. It is also to be noted that the comparative arrangements of connections to contact banks 201 and 301 are such that brushes 202 and 302 although they are stepped simultaneously apply battery to successive switching relays alternately, and therefore that meters 11 and 12 are transferred from one power circuit to another alternately.

Contact bank 501 has its second and third contacts idle, and beginning with the fourth contact, designated 504, alternate contacts are connected together, and by conductor 506 to one side of the winding of switching relay 37, which has the other side of its winding grounded.

Contact bank 601 has all of its contacts beginning with the third, which bears reference character 604, connected together and by conductor 117 to fixed contact 114 of relay 87. Movable contact arm 115 of the relay engages contact 114 when the relay is deenergized and is connected by conductor 120 to start magnet 75. The circuit of start magnet 75 is thus broken when contact arm 115 is attracted by relay 87, which occurs when cam operated contacts 89 are closed and contact arm 84, on relay 37, engages a contact associated with either of the pointers 26 of meters 11 or 12 and the pointer thus connected in the circuit engages either of its contacts 29 or 30. Battery may also be connected locally to start magnet 75 by closing key 116.

The meter reading transmitting system herein described is intended for transmission to a printing telegraph apparatus, particularly of the page printing species. For a complete understanding of a printing telegraph apparatus which may be employed for receiving the signals and printing the meter readings, reference may be had to United States Patent 1,904,164 to Morton et al., April 18, 1933.

In the embodiment of the invention herein described, local control of the transmitting apparatus is contemplated through the agency of the manually operated key 116. It is to be understood that remote control may be provided, to be effected from any desired point, such as the location of the receiving printer. Such remote control could be effected in the manner disclosed in Patent No. 2,057,083, granted October 13, 1936, by providing a biased polar relay responsive to a reversal of current for closing the key 116 and for starting the motor (not shown) which operates the transmitting distributor 70.

In the foregoing description, repeated reference has been made to the application of battery to a commutator, relay winding, brush, contact, or other piece of apparatus. It is to be noted that all batteries have one side connected to ground and that all pieces of apparatus to be actuated by said batteries also have one side connected to ground, so that a common return for all battery circuits is provided.

Before proceeding with a description of the operation of the system for transmitting power meter readings, the idle condition of the apparatus when it is in condition to be started for the transmission of signals will be described. Fig. 1 shows the apparatus in such idle condition, except for the fact that all relays have been shown unoperated, whereas certain ones of the relays are energized in the idle condition preparatory to the transmission of signals. When the apparatus is idle, the brushes 72 of the transmitting distributor 70 are restrained from rotation by the latch 74 due to the fact that start magnet 75 is deenergized. In this position the contact pair 89 is closed and battery is applied to the switching relay 87 which will be energized only if one of the meter indicator pointers 26 is in engagement with one of its contacts 29 or 30, whereby it is connected to ground through one of its associated switching relays 38 or 39. Under these circumstances the common return afforded by the ground would provide a complete circuit to cause the energization of relay 87. The brushes of the sequence switch are shown in their normal or idle position engaging the second contact of each of the banks of contacts. Through sequence switch brush 202 and conductor 206 battery is applied to switching relay 78 so that this relay is energized and the translating units are disconnected from the transmitting distributor, and instead battery is applied to the fourth of the distributor segments 85 and to the second of the segments 83. Through sequence switch brush 302 the switching relay 16a is energized by virtue of its connection to contacts 304 of sequence switch contact bank 301, the first of which is engaged by the brush 302. The energization of the switching relay 16a causes the secondary of transformer 17a to be connected to meter 11, thus maintaining its indicator pointer 26 deflected due to a potential difference across the transformer 17a. The deflection of the pointer 26 results in energization of one or the other of the switching relays 38 and 39 so that the motor 35 is operated and the associated translating unit 41 is set for the coding of the reading of meter 11. If the pointer 26 arrives at a steady deflection, relay 38 or 39 will be deenergized, the motor 35 will be stopped due to disengagement of pointer 26 for contact 29 or 30 and disconnection of battery from switching relay 38 or 39, and the apparatus will be ready for the transmission of the reading of meter 11. Under this condition the switching relay 87 will be deenergized because it must be connected to ground through relay 38 or 39, contact 29 or 30, and pointer 26 in order to be energized, and the contact 114 and 115 closed to permit energization of the start magnet 75 by application of battery through the key 116 when that becomes desirable. Should the pointer 26 not come to a steady deflection, the start magnet 74 cannot be energized for the reason that magnet 87 would be energized and contacts 114 and 115 opened, thus preventing connection of the start magnet 75 to battery. All of the other relays of the 16 series and all of the relays in the 21 series would be deenergized with the sequence switch set as shown, and the meter 12 and its associated switching relays and translating unit would be unoperated. The relays 37 and 101 and the stepping magnet 111 of the sequence switch would be deenergized.

Operation

With the apparatus arranged as described in the preceding paragraph, and with the motor which drives the transmitting distributor brush arm operating, the system may be started by closure of the key 116 manually or by remote control as hereinbefore outlined. This operation causes battery to be applied to start magnet 75 through the contact 114 and contact arm 115 of relay 87 to withdraw latch 74 from engagement with the brush arm of the transmitting distributor so that the brushes may traverse the several segments. Upon passage of the brush over the first of the segments 76, the proper start pulse for starting the receiving printer is transmitted. As only the fourth of the segments is connected to battery under these circumstances, the proper code combination is transmitted to effect a carriage return operation in the receiving printer and in this way its carriage may be returned to the beginning of a line. The brush then traverses the first stop segment 80 and the second start segment 76, which segments condition the receiving printer to receive the next code combination. As the next group of signal transmitting segments is traversed, battery is encountered at the second of the segments 83 and the signal combination thereby transmitted constitutes a line feed signal whereby the page upon which the meter readings are to be printed is advanced to present a new line to the printing point. As the distributor brushes leave the last of the segments 83, the contact pairs 89 and 103 are closed. Through contacts 103 battery is applied to switching relay 101 and the relay is energized to attract its armatures, thereby closing the contacts 98 and 99 and the contact pair 112. The contacts 98 and 99 complete a locking circuit for the switching relay 78 from battery 102 through the conductor 97, contact arm 95, and fixed contact 93. The closure of contact pair 112 permits the stepping magnet 111 to be energized to advance the several sequence switch brushes to the next position. Continued movement of the brushes of the transmitting distributor causes the transmission of stop and start signals, after which the third group of numbered segments is traversed. The only segment of this group which is at any time connected to battery is the segment 96 and in this phase of the operation of the apparatus, no potential is applied to segment 96 by reason of the fact that contact arm 94 of switching relay 78 is out of engagement with the fixed contact 92 due to the energization of the relay. After the brush has traversed segment 96, the contact pair 103 opens, permitting relay 101 to be deenergized, the stepping magnet 111 becomes deenergized and returns to its normal position, and the locking circuit on relay 78 is removed, which causes it to become deenergized and causes the brushes of the translating unit 41 that is associated with meter 11 to be connected to the segments of the transmitting distributor. The transmitting distributor brush completes its cycle by traversing the final stop segment 80 and thus returns to the point of beginning. The contact pair 89 has remained closed during this period and if the indicator pointer 26 of voltmeter 11 has not remained steadily deflected, and as a result the pointer 26 has touched either of the contacts 29 or 30, the relay 87 may be actuated to prevent the energization of start magnet 75 and release of brush arm 73 which would otherwise occur upon advance of the sequence switch brushes and the resultant engagement of brush 602 with contact 604.

Before describing the next cycle of operation of the transmitting distributor, the circuit changes produced by the stepping of the sequence switch brushes will be described. Brush 202 has advanced to the first of contacts 207, which results in the energization of switching relay 21a and connection of the transformers 22a and 23a to the wattmeter 12. Voltages are thus applied to the wattmeter, and its associated relay 38 or 39 is energized due to deflection of the indicator pointer into engagement with contact 29 or 30 and resulting connection of battery to relay 38 or 39 associated with wattmeter 12 to permit the operation of its associated motor 35 and the setting of its associated translating unit 41 to correspond with the reading of the meter. Brush 302 has advanced to the second of the contacts 304 so that battery is still connected to the winding of switching relay 16a which remains energized. No change in circuit conditions occurs at the contact bank 501, the brush 502 advancing to another contact which has no connection to any part of the circuit. Brush 602 has advanced to engagement with contact 604 of contact bank 601 whereby battery is applied from 110 through conductor 113, brush 602, contact 604, conductor 117 to fixed contact 114 of switching relay 87. The potential applied to fixed contact 114 from sequence switch brush 602 replaces the potential applied through key 116 which may then be opened without affecting the operation of the transmitting system.

Meanwhile, assuming that the indicator pointer 26 of voltmeter 11 stands steadily deflected, and conductive pointer 26 engages neither of the contacts 29 and 30, the conductive path between switching relay and its energizing battery will be interrupted at conductive pointer 29, whereby relay 87 will be deenergized and contact arm 115 will be engaging contact 114 to apply an operating potential from sequence switch brush 602 to the winding of start magnet 75 which withdraws stop arm 74 from engagement with transmitting distributing brush arm 73 and permits the latter to rotate. The brushes traverse first start segment 76 from which a start impulse is transmitted to the receiving printer. As the brushes leave the segment 76 the contact pair 89 opens and battery is disconnected from conductor 88, conductor 86, contact arm 84 of switching relay 37 and thus from indicator pointer 26 of voltmeter 11. Since switching relays 38 and 39 can receive operating current only through indicator pointer 26 and one of its associated contacts 29 or 30, it is impossible for either of the switching relays 38 and 39 to become energized so that if there is a subsequent change in the voltage condition which is now being interpreted by the voltmeter 11 and its associated translating unit 41 the positions of the commutators of the translating unit cannot be changed.

As the transmitting distributor brushes traverse the four segments 85, impulses are impressed upon the telegraph line 77 in accordance with the position of the commutator 52 with respect to its brushes 58 and in this way a code combination representing the tens digit of the reading of voltmeter 11 is transmitted over the line 77 to the receiving printer. After the code combination has been transmitted and the extra segment of the group has been traversed, the brushes traverse the stop and start segments to condition the printer to receive the next digit. The brushes then traverse the segments 83 which impress upon the line 77 impulses in accordance with the position of the units commutator 53 with respect to its brushes 57 and thus the units digit of the reading of voltmeter 11 is transmitted. As the brushes 72 leave the last of the segments 83, contact pair 89 and the contact pair 103 are closed in a manner previously described to apply a voltage to the winding of switching relay 87 and to energize relay 101. Transmitting distributor brushes 72 continue to rotate and segment 96 is traversed, from which an impulse received from battery through the contact arm 94 engaging fixed contact 92 of switching relay 78 is impressed upon the line. This impulse in combination with the neutral condition of the segments preceding and following segment 96 constitutes a spacing signal under the control of which the receiving printer performs a spacing operation. As the impulse from segment 96 is being transmitted, contact pair 103 opens, and switching relay 101 which had been energized to permit stepping magnet 111 to operate is deenergized. The operation of the stepping magnet 111 advances the brushes of the sequence switch to the next contact of each contact bank. While this is occurring, the brushes of the transmitting distributor continue to the end of their cycle of operation and transmit the final stop signal of that cycle to the receiving printer.

During the transmission of the reading of voltmeter 11 described in the preceding paragraph, the wattmeter 12 is conditioned to be read. This occurs by virtue of the fact that the switching relay 21a is energized from the first of the contacts 207 of sequence switch bank 201 and deflection of the indicator pointer 26 of the wattmeter 12 under the influence of impressed voltage and current conditions causes the translating unit 41 associated therewith to be conditioned to transmit the reading of the wattmeter 12. As stated in the preceding paragraph, the sequence switch brushes were advanced upon the completion of the transmission of the second digit of the reading of voltmeter 11. Brush 202 advanced to the second of the contacts 207 and the switching relay 21a was thereby held energized; brush 302 advanced from the second of the contacts 304 to the first of the contacts 306, thereby disconnecting switching relay 16a from battery and connecting switching relay 16b thereto. The effect of this is to connect the transformer 17b to the voltmeter 11 so that the reading of the voltage of the next circuit can be transmitted. There is no change in circuit conditions as a result of the advance of brush 602, but sequence switch brush 502 advances into engagement with contact 504 of contact bank 501 as a result of which battery is applied through conductor 506 to the winding of switching relay 37, thus causing the relay to be energized and the contact arms 79, 84, and 36 to move from the left-hand to the right-hand positions. In their new positions contact arms 79 connect the brushes of the translating unit 41 associated with the wattmeter 12 to the segments of the transmitting distributor. The contact arm 84 transfers control of the switching relay 87 from the indicator pointer of voltmeter 11 to that of wattmeter 12, and contact arm 36 transfers a direct battery connection from the indicator pointer of wattmeter 12 to that of the voltmeter 11.

With a circuit condition as described in the preceding paragraph, the switching relay 87 is deenergized and battery is applied to the start magnet 75 providing indicator pointer of wattmeter 12 has reached a steady deflection and engages neither of its associated contacts 29 or 30. When this condition exists, the start magnet 75 is actuated to release transmitting distributor brushes, and the brushes traverse the segments and transmit to the line 77 the proper start and stop impulses and the impulses supplied by the brushes of the translating unit associated with the wattmeter 12 so that the receiving printer may print the reading of that instrument. Upon the completion of the transmission of the reading, a spacing signal is transmitted as previously described, the sequence switch brushes are stepped to their next positions, and the brushes of the transmitting distributor complete a cycle of operation. The advance of the sequence switch brushes brings brush 202 into engagement with the first of the contacts 208 whereby battery is disconnected from switching relay 21a and is connected to switching relay 21b so that the transformers 22b and 23b may be connected to the wattmeter 12. Brush 302 advances to the second of the contacts 306 and holds battery applied to the winding of switching relay 16b. Brush 502 advances from contact 504 to a free or dead contact, thus removing battery from the conductor 506 and permitting switching relay 37 to be deenergized. All of the contact arms 79 and the contact arms 84 and 36 return to their left-hand position to permit the reading of the voltmeter 11 which is then under influence of the circuit associated with the transformer 17b to be transmitted to the line 77.

In the manner described in the foregoing paragraphs, the transmission of readings of the meters proceeds, the meters being connected alternately to power circuits to be conditioned and to the transmitting distributor for the transmission of a reading so that while the translator 41 of one meter is being conditioned, the reading of the other is being transmitted. With each cycle of operation of the transmitting distributor, impulses representing two digits and a spacing signal are transmitted. Eventually the sequence switch brush 202 comes into engagement with the last contact of the bank 201 which is the second of the contacts identified by the reference numeral 210. At the same time the brush 302 comes into engagement with the contact 309 of bank 301, which is the last contact of that bank and which is connected by conductor 310 to the previously described contacts 304. When this occurs, the wattmeter 12, which would be conditioned for reading during the preceding cycle of operation of the transmitting distributor, has its translating unit 41 connected to the segments of the transmitting distributor by reason of the energization of the switching relay 37 from the last contact of contact bank 501 which is then engaged by brush 502. During this transmission of the wattmeter reading, the switching relay 16a is energized as a result of its connection to contact 309 to which battery is connected from the brush 302 and the translating unit associated with the voltmeter 11 is conditioned for transmission of the reading of the meter. As the next cycle of operation of the transmitting distributor is completed, the brushes of the sequence switch advance to the positions shown in Fig. 1, which has been described as the initial or starting condition. Brush 202 connects battery to conductor 206 from which switching relay 78 is energized to disconnect the translating unit brushes from the segments of the transmitting distributor and to connect to the proper segments of the transmitting distributor the potentials required to provide carriage return and line feed signals. Switching relay 16a remains energized for the reason that sequence switch brush 302 again engages the first of the contacts 304. Sequence switch brush 502 engages an idle contact so that switching relay 37 is deenergized. The brush 602 also engages a dead contact and the potential for operating the start magnet 75 which would be applied thereto through the conductor 117 and contacts 114 and 115 is removed so that the start magnet is unable to release the brushes 72 for the transmission of the carriage return and line feed signals. In order for the apparatus to be started again, it is necessary to close the key 116 manually or by remote control to apply a potential to the start magnet 75 to release the transmitting distributor brushes for a cycle of operation during which, as previously described, the sequence switch brushes are advanced and a local potential is applied to the start magnet 75 from the sequence switch brush 602.

The functions of the switching relays 37 and 87 are of sufficient importance to merit particular mention. The switching relay 37 in addition to connecting one or the other of the two translating units to the transmitting distributor also connects the indicator pointer of that instrument from which a reading is about to be transmitted to battery through the winding of switching relay 87, which receives battery through the contact pair 89. Thus if a meter has not reached a stable condition as the transmitting distributor brushes approach their starting point, one of the relays 38 or 39 will be in a state of energization to permit the motor 35 to move the contact arms 27 and 28, and the current which energizes the relay 38 or 39 will also traverse and energize the winding of relay 87 to cause the contact pair 114—115 to open. When these contacts are opened, the start magnet 75 cannot be energized from the sequence switch brush 602 and, therefore, the transmitting distributor is not permitted to start until a stable condition of the meter, the reading of which is to be transmitted, is reached. In addition to controlling the circuit arrangement of the switching relay 87, with respect to the conductive pointers of the meters 11 and 12, the switching relay 37 also shifts from one to another of the pointers direct battery connection through the contact arm 36 to provide the potential for the operation of the relay 38 or 39 associated with a meter which is to be conditioned to have its reading transmitted.

The provision of the contact pair 89 in the circuit of the switching relay 87 provides for an unchanging condition of a translating unit during the transmission of a reading therefrom. The timing of these contacts is such that they are open during the time that those segments of the transmitting distributor which carry meter reading signal impulses are traversed by the brushes. During this interval, the pointer of the meter, the reading of which is being transmitted, cannot receive battery from the contacts 89; therefore neither of its associated relays 38 or 39 can be energized and the motor 35 of its translating unit cannot be started.

Only the starting of the system can be accomplished by closure of the key 116 or by remote control. Its operation cannot be interrupted by any recognized or conventional means during the transmission of the readings of conditions of a series of power circuits. A potential for operating the start magnet 75 is available at the contact bank 601 of the sequence switch in all positions of the brush except the position shown in Fig. 1. When the apparatus has once been started, it will continue to operate until the sequence switch brushes have traversed all of the contacts and have returned to the initial position, and in this cycle of operation of the sequence switch, the readings of circuit conditions of all power circuits connectable to the meters under the control of the several sequence switch contacts will be transmitted.

As previously described the transmitting distributor segment 96 in combination with the adjacent numbered segments provides a spacing signal combination whereby the receiving printer is caused to perform a spacing operation after the reception of each two-digit meter reading. In this way voltmeter and wattmeter readings are printed alternately in a line across a page with a space between each two readings and a line is completed when voltmeter and wattmeter readings for all of the power circuits to be metered under the control of the sequence switch have been recorded. In the next cycle of operation, the transmitting distributor impresses upon the telegraph line impulses which cause the receiving printer to perform line feed and carriage return functions. The carriage of the printing apparatus is thus presented at the beginning of a line, and the paper on which the readings are printed is advanced to present a blank line to the printing point. If the transmitting apparatus is then started in order that the several power circuits may again be metered, the voltmeter reading from the circuit associated with transformer 17a will be printed directly under the preceding reading for that circuit, the receiving printer will perform a spacing operation, and the wattmeter reading for the power circuit associated with the transformers 22a and 23a will be recorded directly under the preceding wattmeter reading for that circuit.

In this manner all of the circuits will be metered and their readings recorded directly under the respective preceding readings. The result is that as a page of readings develops, the readings will appear in columns upon the page and all of the readings in a vertical column indicate a given condition of a particular circuit. Thus all of the readings in the first column would represent voltmeter readings for the circuit associated with the transformer 17a, the readings in the second column would represent wattmeter readings for the same power circuit, and the readings in the third and fourth columns would represent voltmeter and wattmeter readings respectively for the power circuit associated with the transformers 17b, 22b, and 23b.

It will be observed that the system herein described provides for a minimum of idle telegraph line time for the reason that two meters are provided, the readings of which are transmitted alternately so that the time required for conditioning one meter to a steady deflection does not represent a waste of line times, as a reading is being transmitted from the other meter. The transmission of impulses representing the true reading of a meter is assured by an automatic adjustment of the brushes associated with the tens digit commutator in relation to certain positions of the units digit commutator. The brushes are carried forward or backward with respect to the commutator as the units digit commutator passes between a surface zone representing 9 and one representing zero so that errors due to failures of carry-over of the tens digit coding apparatus cannot occur. The possibility of errors in the recording of readings is eliminated by preventing the transmission of readings until a meter has reached a steady deflection. The possibility of errors due to changing circuit conditions in the power circuits during the transmission of a reading is eliminated by disabling the motor which actuates a translating unit at the time that the transmission of a reading from that translating unit begins and continuing such disablement until the transmission of the readings has been completed. The transmission of meter readings for all circuits associated with the system is assured by providing a local source of potential for operating the start magnet of the transmitting distributor which is brought into effective connection with the start magnet when the system is started either locally or by remote control and which cannot be disconnected from the start magnet by local or remote control during the transmission of a series of readings, but can only be disconnected by return of the sequence switch brushes to their normal or initial positions.

Although a specific embodiment of the invention has been described in the foregoing specification, it is to be understood that the invention is capable of modification and substitution as to the elements entering into the system, and as to the combination and arrangement of the elements, within the scope of the appended claims.

What is claimed is:

1. In a system for transmitting power meter readings telegraphically, a plurality of power circuits to be metered, a plurality of measuring instruments to be connected to said power circuits consecutively, means for connecting said instruments to said circuits, means associated with each of said measuring instruments and controlled thereby for coding the reading thereof, means for transmitting coded readings, and means for connecting one of said coding means to said transmitting means while another coding means is being controlled by its associated measuring instrument.

2. In a system for transmitting meter readings telegraphically, a meter to be read having an indicating element to which a potential may be applied, means for applying a potential to said element, means controlled from the indicating element for coding a meter reading, means for transmitting a coded reading, and means for disabling the transmitting means when the indicating element is exercising control over said coding means.

3. In a system for transmitting meter readings telegraphically, a meter to be read having an indicating element to which a potential may be applied, a source of potential for said element, means controlled from the indicating element for coding a meter reading, means for transmitting a coded reading, and a relay having the winding thereof connected between said source of potential and said indicating element and having the armature thereof exercising control over said transmitting means for disabling the transmitting means when the indicating element is controlling said coding means.

4. In a system for transmitting power meter readings, a plurality of power circuits to be metered, a meter, a sequence switch for connecting said circuits to said meter successively, means for coding the meter reading according to a telegraph message matter code, means for transmitting the coded reading, means for advancing the sequence switch step by step according to the variable time intervals required to accomplish the metering of the circuits and means for insuring the continued operation of the sequence switch until readings representing all of the power circuits have been transmitted.

5. In a system for transmitting power meter readings telegraphically, a plurality of power circuits to be metered, a plurality of meters, relay means individual to each of the power circuits for connecting said circuits consecutively with said meters, progressively operated means for controlling the energization of said relay means, a coding element individual to each of said meters, means responsive to the operation of a meter for causing a selective operation of said coding element, a transmitting distributor, and means for operating said transmitting distributor upon arrival of said meters at steady deflection to effect the transmission of impulses indicative of the operation of said coding element as determined by the operation of its associated meter.

6. In a system for transmitting power meter readings telegraphically, a plurality of power circuits to be metered, a pair of meters, relay means intermediate said power circuits and said meters for connecting said circuits to said meters, progressively operated means for consecutively operating pairs of said relay means for connecting pairs of said power circuits with said meters, mechanism associated with each of said meters for selectively establishing coded conditions indicative of the setting of said meters, means operated from said meters for operating said mechanism, a transmitting distributor, and means for connecting said mechanisms alternately to the transmitting distributor whereby impulses indicative of the settings of said mechanisms will be transmitted.

7. In a system for transmitting power meter readings telegraphically, a plurality of power circuits to be metered, a plurality of meters, means for connecting said meters consecutively with said power circuits, means for selectively establishing coded conditions indicative of the setting of said meters, a transmitting distributor arranged for each cycle of operation to transmit two character conditions, and means effective for connecting said coding means with said transmitting distributor whereby impulses indicative of the digits represented by the setting of said meters will be transmitted.

8. In a system for transmitting power meter readings telegraphically, a plurality of power circuits to be metered, a plurality of meters, means for connecting said meters consecutively with said power circuits, means for establishing coded conditions indicative of the setting of said meters, a transmitting distributor arranged for each cycle of operation to transmit two character conditions, means effective for connecting said coding means with said transmitting distributor whereby impulses indicative of the digits represented by the setting of said meters will be transmitted, and means effective under predetermined conditions for establishing connections to said distributor whereby upon the operation of said distributor conditions indicative of mechanical functions of a receiving printer will be transmitted.

9. In a system for transmitting power meter readings telegraphically, a plurality of power circuits to be metered, a plurality of meters, relay means for controlling the connection of said power circuits consecutively with said meters, a step-by-step sequence switch, a transmitting distributor, means controlled by said transmitting distributor for causing the step-by-step operation of said sequence switch to cause said relay means to connect consecutively said power circuits with said meters, a coding mechanism individual to each meter started into operation upon the operation of said meters for establishing conditions indicative of the final setting of said meters, and means controlled by said sequence switch for successively connecting said coding mechanisms with said transmitting distributor whereby upon successive operations of said distributor impulses indicative of said coding mechanisms will be transmitted consecutively.

10. In a sysetm for transmitting power meter readings telegraphically, a plurality of power circuits to be metered, a plurality of meters, means for connecting consecutively said power circuits with said meters, a pair of coding mechanisms set in accordance with the final position of said meters, a relay effective in one position to establish circuits from one of said mechanisms and effective in another position for establishing circuits from the other of said mechanisms, and a transmitting distributor for transmitting during each cycle of operation impulse conditions indicative of the conditions established by said coding mechanisms.

11. In a system for transmitting power meter readings telegraphically, a plurality of power circuits to be metered, a plurality of meters, means for connecting consecutively said power circuits with said meters, a pair of coding mechanisms set in accordance with the final position of said meters, a relay effective in one position to establish circuits from one of said mechanisms and effective in another position for establishing circuits from the other of said mechanisms, a transmitting distributor, means for causing the cyclic operation of said distributor, and means operated under predetermined conditions for operating said last recited means to cause the operation of said distributor whereby impulses indicative of the conditions established by said coding mechanisms will be transmitted.

12. In a system for transmitting power meter readings telegraphically, a plurality of power circuits to be metered, a plurality of meters, means for connecting said power circuits consecutively to said meters, a sequence switch for operating said means, mechanism for establishing coded conditions indicative of the final setting of said meters, a transmitting distributor, means for connecting said coding mechanism with said transmitting distributor whereby impulses indicative of the position of said coding mechanism will be transmitted, and means controlled by said transmitting distributor for causing the step-by-step advancement of said sequence switch.

13. In a system for transmitting power meter readings telegraphically, a plurality of power circuits to be metered, a plurality of meters, means for connecting said power circuits consecutively to said meters, a sequence switch for operating said means, a coding mechanism individual to each meter and operative in accordance with the operation of said meters for establishing a condition indicative of the final setting thereof, relay means controlled by said sequence switch for successively rendering the circuits of said coding mechanisms effective, a transmitting distributor for transmitting impulses indicative of the position of said coding mechanisms, and means controlled by said sequence switch for causing said distributor to transmit impulses indicative of conditions other than those established by said coding mechanisms.

14. In a system for transmitting power meter readings telegraphically, a plurality of power circuits to be metered, a pair of instruments for metering two different characteristics of each circuit, successively operable means for connecting said instruments to each circuit, means for simultaneously operating a connecting means associated with each of two circuits for connecting said instruments to meter one characteristic of one of said two circuits and another characteristic of the other of the two circuits, means associated with each of the instruments for coding the readings thereof according to a telegraph message matter code, means for transmitting the coded readings, and means for connecting the coding means alternately to the transmitting means.

EDWARD S. LARSON.
CARL A. LEVIN.